US006757822B1

United States Patent
Feiertag et al.

(10) Patent No.: US 6,757,822 B1
(45) Date of Patent: Jun. 29, 2004

(54) SYSTEM, METHOD AND COMPUTER PROGRAM PRODUCT FOR SECURE COMMUNICATIONS USING A SECURITY SERVICE PROVIDER MANAGER

(75) Inventors: Richard J. Feiertag, Mountain View, CA (US); Roshan Thomas, Reston, VA (US); Jaisook Rho, Palo Alto, CA (US); Eve L. Cohen, Los Angeles, CA (US); Sebastien T. Rosset, Milpitas, CA (US); Timothy Redmond, Mountain View, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 898 days.

(21) Appl. No.: 09/586,558

(22) Filed: May 31, 2000

(51) Int. Cl.[7] .................. H04L 9/00; G06F 15/173; G06F 15/16
(52) U.S. Cl. .................. 713/152; 713/164; 713/201; 709/224; 709/227
(58) Field of Search ................ 713/151, 152, 713/153, 200, 201; 709/224–25, 227–29

(56) References Cited

U.S. PATENT DOCUMENTS

| 5,265,164 | A | * | 11/1993 | Matyas et al. ............. 380/30 |
| 5,784,566 | A | * | 7/1998 | Viavant et al. ............ 709/229 |
| 5,841,870 | A | | 11/1998 | Fieres et al. ............. 380/25 |
| 5,933,503 | A | | 8/1999 | Schell et al. ............. 380/25 |
| 5,974,149 | A | * | 10/1999 | Leppek .................... 713/164 |
| 6,035,041 | A | | 3/2000 | Frankel et al. ............ 380/30 |
| 6,088,451 | A | * | 7/2000 | He et al. .................. 713/201 |
| 6,335,972 | B1 | * | 1/2002 | Chandersekaran et al. .. 380/286 |
| 6,339,830 | B1 | * | 1/2002 | See et al. ................. 713/202 |
| 6,397,330 | B1 | * | 5/2002 | Elgamal et al. ........... 713/164 |

FOREIGN PATENT DOCUMENTS

| EP | 0942349 A2 | 9/1999 | ............. G06F/1/00 |
| WO | WO 99/14652 | 3/1999 | ............. G06F/1/00 |

OTHER PUBLICATIONS

Common Data Security Architecture Specification 1.0, Oct. 1996, Intel Corporation.*
Microsoft Corporation; "Microsoft CryptoAPI Overview"; Mar. 5, 1998; Microsoft Corporation.

* cited by examiner

Primary Examiner—Gilberto Barrón
Assistant Examiner—Minh Dinh
(74) Attorney, Agent, or Firm—Silicon Valley IP Group, PC; Kevin J. Zilka; Christopher J. Hamaty

(57) ABSTRACT

A system, method and computer program product are provided for managing the use of a plurality of security service providers during network communication. A first security service provider is utilized for affording secure communication between applications using a network. During operation, the system is monitored for events relating to the secure communication between the applications. Upon the detection of an event, a second security service provider is utilized for affording secure communication between the applications using the network.

30 Claims, 6 Drawing Sheets

SYSTEM, METHOD AND COMPUTER PROGRAM PRODUCT FOR SECURE COMMUNICATIONS USING A SECURITY SERVICE PROVIDER MANAGER

GOVERNMENT LICENSE RIGHTS

The present invention was made with Government support under contract #F30602-97-C-0187 awarded by USAF, AFMC, Rome Laboratory, Directorate of Contracting/ PKRZ, 26 Electronic Parkway, Rome, N.Y. 13441-4514. The Government has certain rights in the invention.

FIELD OF THE INVENTION

The present invention relates to network security, and more particularly to providing secure communications between applications over a network.

BACKGROUND OF THE INVENTION

Today, more and more critical information systems, including commercial and U.S. Departrnent of Defense (DoD) sites, are the constant target of network and system attacks. These attacks range from simple and well-known strikes often conducted by young hackers by means of widely available and ready-to-use scripts, to very elaborated attacks led by well-funded organizations or foreign countries.

During operation, systems often rely on security service providers in order to add security enhancements for combating the foregoing attacks. Prior Art FIG. 1 illustrates a system 100 which provides such security enhancements using security service providers in a manner known in the art. As shown, applications 102 are connected to a network 104 by way of network providers 106 for communication purposes. Coupled between the applications 102 and the network providers 106 are security service providers 108. It should be noted that the security service providers 108 may be invoked by the applications 102, the network providers 106, and/or any other third parties. During use, such security service providers 108 may afford security components including, but not limited to authentication, confidentiality, integrity, policy enforcement, etc. Often, these security components may become a likely target of attacks.

In particular, the foregoing security components afforded by the security service providers 108 may employ a set of techniques for encoding data and messages such that the data and messages can be stored and transmitted securely. Such techniques can be used to achieve secure communications, even when the transmission media (for example, the Internet) is untrustworthy. Further, they may also be used to encrypt sensitive files so that an intruder cannot understand them, to ensure data integrity as well as to maintain secrecy, and to verify the origin of data and messages. This may be accomplished using certificates, cryptographic policies, and cryptographic keys.

A certificate may be thought of as a data structure containing information or data representing information, associated with assurance of integrity and/or privacy of encrypted data. A certificate binds an identity of a holder to a key of that holder, and may be signed by a certifying authority. A signature is sometimes spoken of as binding an identity of a holder to a key in a certificate. As a practical matter, a certificate may be very valuable in determining some level of confidence in keys associated with encryption.

Government authorities throughout the world have interests in controlling the use of cryptographic algorithms and keys. Many nations have specific policies directed to creation, use, import, and export of cryptographic devices and software. Numerous policies may exist within a single government. Moreover, these policies are periodically undergoing constant change.

When using cryptographic methods, the only part that may be required to remain secret is the cryptographic key. The algorithms, key sizes, and file formats can be made public without compromising security. One example of security service providers are the set of Cryptographic Security Providers that can be invoked using the Microsoft Cryptographic API (Crypto API). Another example of security service providers are the set of Cryptographic Security Providers that can be invoked in accordance with the Java Cryptography Extension (JCE), which currently include JCE 1.2-compliant offerings from RSA, Inc., and Entrust Technologies. Application developers can use any of these cryptographic providers to manually add cryptography and certificate functionality.

Despite the foregoing techniques, systems 100 such as that shown in Prior Art FIG. 1 often fail as a result of a run-time software or hardware fault, or an intrusion by a hacker. In such situations, the system 100 often provides a notification of the problem, and allows the user to react. In response to the notification, a user has little choice but to re-instantiate the security service provider 108, or manually "plug-in" a different security service provider 108. This provides for a very static, cumbersome solution.

There is therefore a need for a system that allows for a more dynamic, fault-tolerant means of providing secure communication over networks.

DISCLOSURE OF THE INVENTION

A system, method and computer program product are provided for managing the use of a plurality of security service providers during network communication. A first security service provider is utilized for affording secure communication between applications using a network. During operation, the system is monitored for events relating to the secure communication between the applications. Upon the detection of an event, a second security service provider is utilized for affording secure communication between the applications using the network.

In one preferred embodiment, the event is a security-related event including a run-time error and/or an intrusion by a hacker. As an option, the use of the first security service provider may be discontinued in response to the detection of the event. Further, a notification may be generated in response to the detection of the event.

In another preferred embodiment, the second security service provider may be of a type similar to that of the first security service provider. Further, the second security service provider may be executed on a host different from that of the first security service provider. In still yet another preferred embodiment, the second security service provider may be of a type different from that of the first security service provider.

In order to prevent a failure from affecting the applications, an address space of the applications may be different from that of the security service providers. Further, a host on which each of the applications is executed may be different from a host on which each of the security service providers is executed.

In another aspect of the preferred embodiments, a method may be provided for initially establishing secure communication over a network using a plurality of security service providers. First, an indication is received that communication is to be established on a network between a first application and a second application. In response thereto, at least one of a plurality of security service providers may be chosen for affording secure communication between the first application and the second application. During operation, the chosen security service provider may be used for affording secure communication between the first application and the second application utilizing the network.

The security service provider may be chosen by exchanging a set of acceptable security service providers between the first application and the second application utilizing the network. Subsequently, at least one of the security service providers may be chosen from the set.

As such, the security service provider may be chosen based on whether it is acceptable to both the first application and the second application. In the alternative, the security service provider may be chosen based on security requirements associated with the secure communication between the first application and the second application.

In still another preferred embodiment, each of the security service providers may use a single, common network provider for affording secure communication between the first application and the second application. In the alternative, separate network providers may be employed by each of the security service providers. Similarly, a single, common network connection or separate network connections may be employed by each of the security service providers.

DESCRIPTION OF THE PREFERRED EMBODIMENTS

Figure 1:
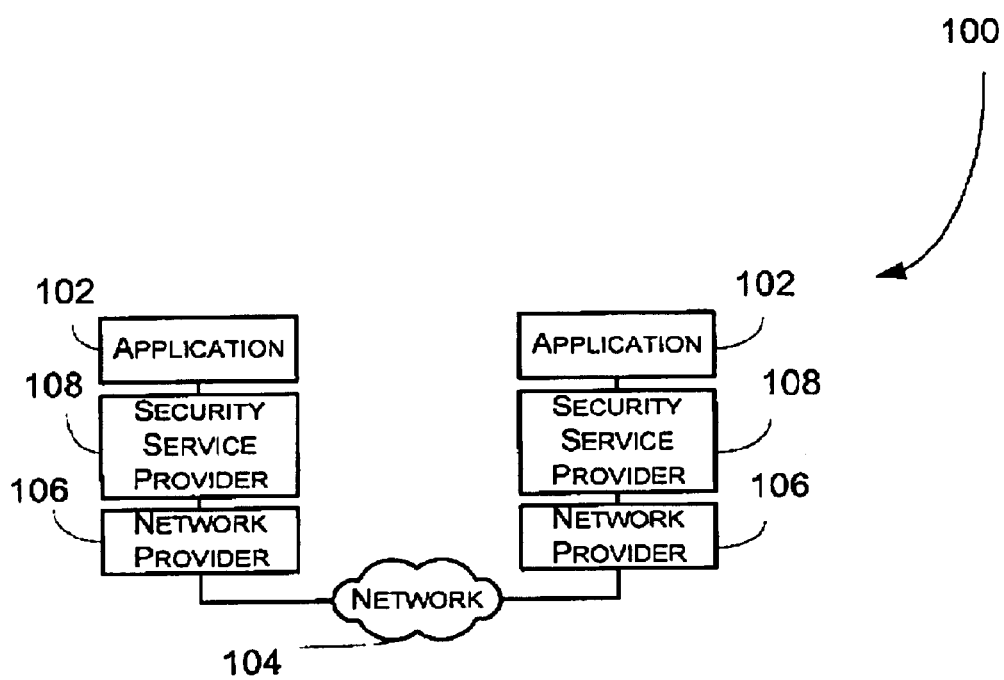
FIG. 1 illustrates a system which provides security enhancements using security service providers in accordance with the prior art.
Figure 2:
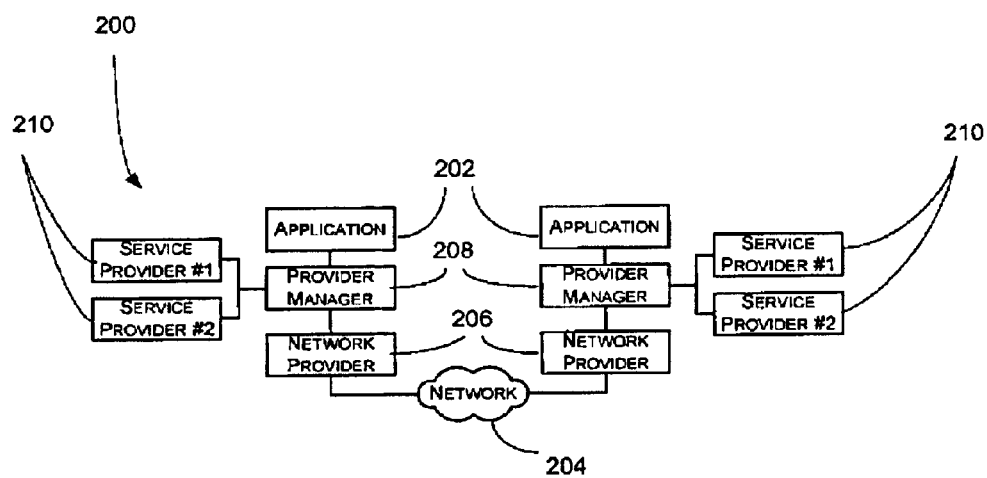
FIG. 2 illustrates a system which provides security enhancements using a security provider manager in accordance with a preferred embodiment.

Prior Art FIG. 1 illustrates a system 100 which provides security enhancements using security service providers in a manner known in the art. FIG. 2 illustrates a system 200 which provides security enhancements using a plurality of security service providers managed by security provider managers.

As shown in FIG. 2, applications 202 are connected to a network 204 by way of network providers 206 for communication purposes. Coupled between each of the applications 202 and network providers 206 is a security provider manager 208. Each of the security provider managers 208 is in turn coupled to a plurality of security service providers 210. In operation, the security service providers 210 are adapted to provide security components including, but not limited to cryptography, authentication, confidentiality, integrity, policy enforcement, stenography, digital watermarking, or any other technique that is capable of affecting the security of network communication.

In the present description, it should be noted that, in the context of software, the terms: applications, security service providers, and security provider managers all may not only refer to separate applications, security service providers, and security provider managers, respectively, but also separate instances of the same. For example, when referencing first and second applications or security service providers, such may refer to first and second distinct entities, or separate instances, or executions, of a similar entity. Further, it should be noted that the foregoing terms may relate to any type of hardware or software component that uses a network.

In use, the security provider managers 208 are generally capable of selecting and changing between the security service providers 210 in real time. Such changing may be effected at anytime, and particularly when one of the security service providers 210 fails. Such dynamic composition may be completely transparent to the applications 202 using the associated security provider manager 208.

The security provider managers 208 thus may not necessarily need to contribute any security enhancements, but rather manage a set of security service providers 210 and rely on such security service providers 210 for security services. For each communication, the security provider managers 208 are initially capable of selecting at least one security service provider 210 that best fits the security requirements of the applications 202. Further, the security provider managers 208 are adapted for implementing a recovery protocol, which allows the dynamic replacement of the security service providers 210. By this design, the system 200 is rendered fault-tolerant, thus improving survivability.

Figure 3:
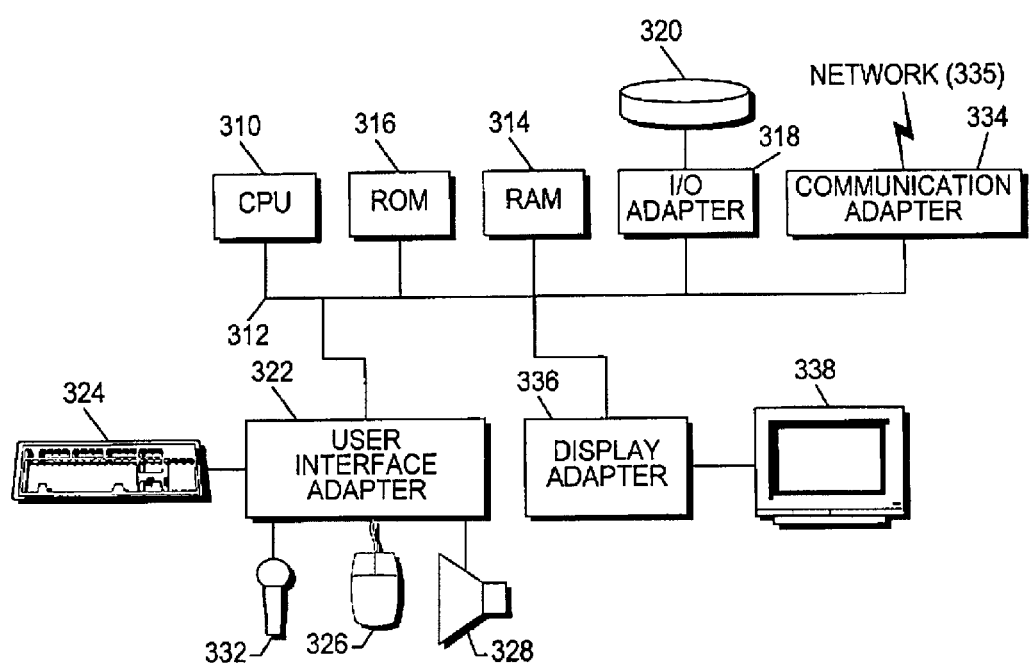
FIG. 3 shows a representative hardware environment on which the various components of FIG. 2 may be implemented.

A representative hardware environment on which the various components of FIG. 2 may be implemented is depicted in FIG. 3. Such figure illustrates a typical hardware configuration of a workstation in accordance with a preferred embodiment having a central processing unit 310, such as a microprocessor, and a number of other units interconnected via a system bus 312. The workstation shown in FIG. 3 includes a Random Access Memory (RAM) 314, Read Only Memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network 335 (e.g., a data processing network) and a display adapter 336 for connecting the bus 312 to a display device 338.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 4:
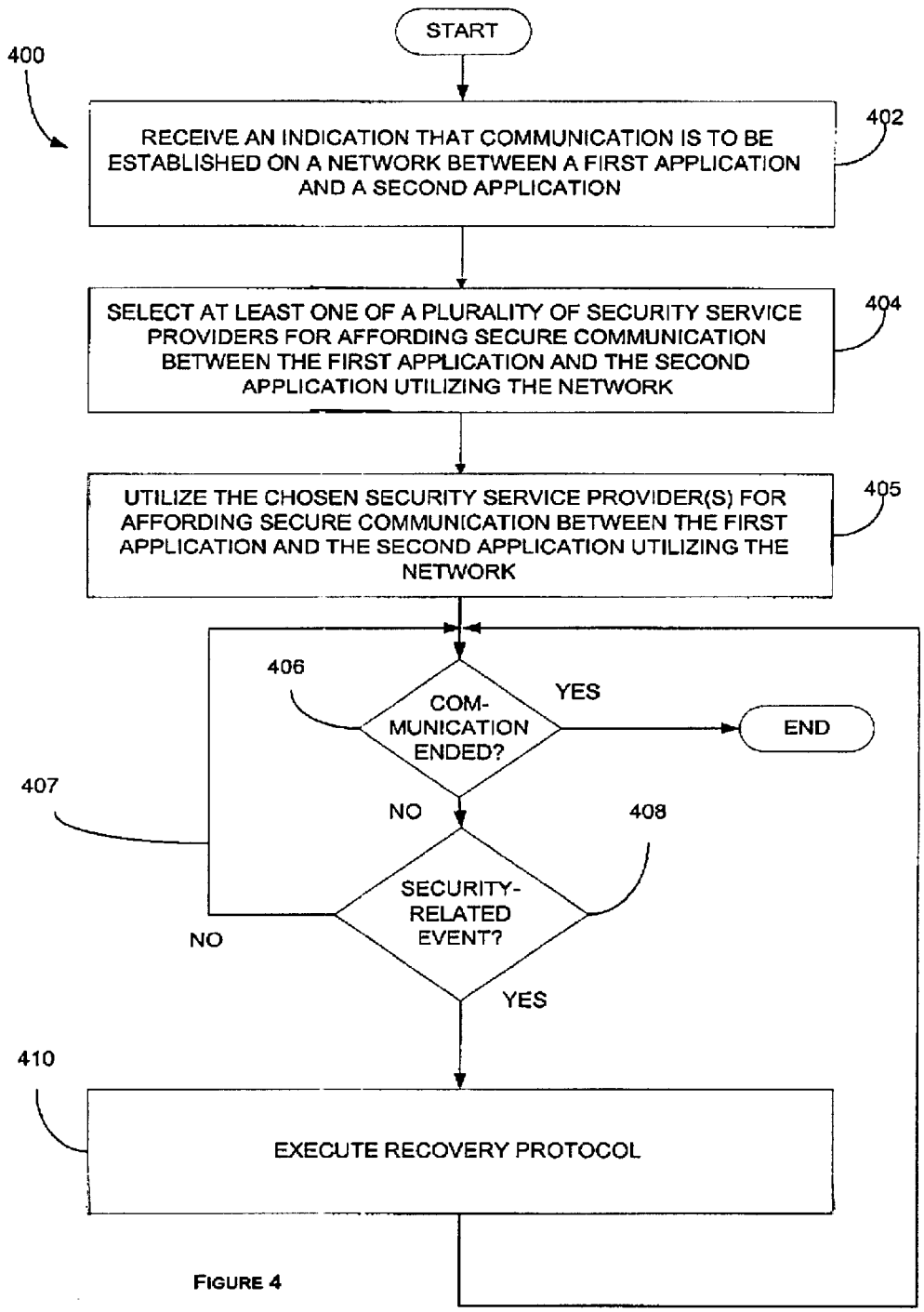
FIG. 4 shows steps taken in selecting one of the security service providers for initially establishing secure communication over a network in accordance with a preferred embodiment.

FIG. 4 is a flowchart illustrating a method 400 for selecting one of the security service providers 210, and initially establishing secure communication over a network. First, in operation 402, an indication is received that communication is to be established on a network between a first application and a second application. In response thereto, at least one of a plurality of security service providers 210 may be chosen for affording secure communication between the first application and the second application utilizing the network. See operation 404.

The security service provider 210 may be chosen by exchanging a set of acceptable security service providers 210 between the first application and the second application utilizing the network. Subsequently, at least one of the security service providers 210 may be chosen from the set.

As such, the security service provider 210 may be chosen based on whether it is acceptable to both the first application and the second application. Further, the security service provider 210 may be chosen based on security requirements associated with the secure communication between the first application and the second application. For example, such security requirements may pertain to authentication, confidentiality, integrity, non-repudiation, policy enforcement, scalability, interoperability, survivability, and/or any other security-related requirements. While the various factors associated with each of the foregoing requirements are known, it should be noted that interoperability may refer to the ability of the security service providers 210 to work together, and survivability may refer to the past performance and/or reliability of the security service providers 210. In a preferred embodiment, a distributed survivability manager may be used to track measurement data for the various the security service providers 210.

At the beginning of a communication, the security provider managers 208 associated with the first and second applications 202 may negotiate to select the desired security service provider(s) 210. Often, the communicating parties may share at least one type of compatible security service provider 210. For example, both may have access to a TLS/SSL [TLS] Service Provider. After one type of security service provider 210 has been chosen, the security service provider 210 may open a secure communication using an associated negotiation security mechanism.

Even if the communicating parties have no prior knowledge of shared secret information, the security provider managers 208 can still negotiate securely which security service provider 210 will be used. This is done by first exchanging the set of acceptable security service providers 210 in the clear, then establishing the communication by effectively adding the security enhancements of the security service provider 210, and then exchanging verification messages, using the security of the security service provider 210. The security provider managers 208 take advantage of integrity, authentication and confidentiality functions offered by the security service provider 210 to secure the handshake. In a preferred embodiment, a registry may be used to permit access to the set of security service providers 210 in a manner modeled after the known Domain Name Service (DNS) associated with the Internet.

During operation 405, the chosen security service provider 210 may be used for affording secure communication between the first application and the second application utilizing the network. This is accomplished by the security provider manager 208 passing security requirements from the applications 202 to the security service providers 210. Each security service provider 210 may use a particular negotiation mechanism to establish a secure communication with the selected security service provider 210 of another application. In use, the security service providers 210 may add authentication, integrity, confidentiality, and other security-related enhancements based on the security requirements.

The system 200 may thus be monitored for events relating to the secure communication between the applications 202. Monitored events may include a run-time hardware or software error, an intrusion by a hacker, and/or any other security-related event. Such events may be detected by way of sensors embedded in the system, or instrumenting providers. Further, an intrusion/detection system may be employed to detect the intrusion by a hacker.

As shown in FIG. 4, it is determined in decision 406 if the communication between the applications 202 has ended. If so, method 400 is ended. If not, however, it is determined in decision 408 whether a security-related event has occurred. The security provider manager 208 may filter incoming events to ensure that only security-related events trigger steps in accordance with the preferred embodiments. Such filtering may include various diagnostics used to filter out events that do not affect the security of the communication in the system 200. If no security-related event has occurred, a loop 407 is initiated until such security-related event is detected or the communication between the applications 202 has been terminated. Upon the detection of the security-related event, a recovery protocol is executed in operation 410.

Figure 5:
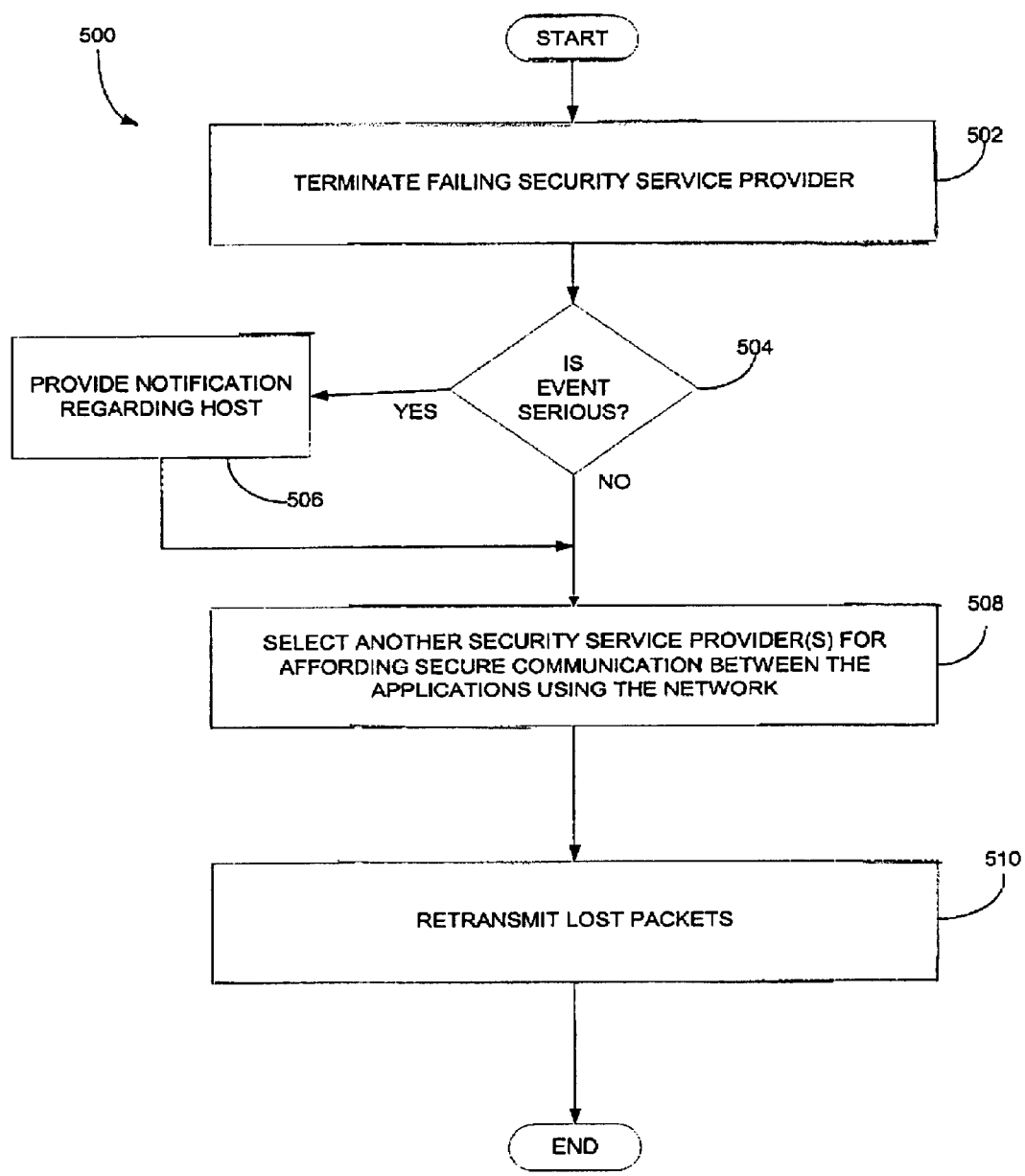
FIG. 5 shows steps taken in managing the use of a plurality of security service providers during network communication.

FIG. 5 is a flowchart illustrating a method 500 for managing the use of a plurality of security service providers 210 during network communication, in accordance with the recovery protocol of operation 410 in FIG. 4. Initially, in operation 502, the failing security service provider 210 is terminated. Thereafter, it is determined in decision 504 whether the security-related event is serious. In a preferred embodiment, a serious security-related event may refer to an intentional action by a hacker. If decision 504 holds true, a notification may be generated that indicates a host on which the security service provider 210 is operating is under attack. With such notification, other applications 202 running on the host may initiate a process similar to that shown in FIG. 5. In addition, the applications 202 may optionally be isolated, or cut off, from the network 204 in response to the detection of the event in operation 506.

In operation 508, another security service provider 210 is selected for affording secure communication between the applications 202 using the network 204. The selection of the other security service provider 210 may be based on satisfying the security requirements of the application 202 as set forth earlier. It should be noted that the selected security service provider 210 may be of a type similar to that of the first security service provider 210 that failed, and be executed on a host different from that of the first security service provider 210. In still yet another embodiment, the second security service provider 210 may be of a type different from that of the first security service provider 210. For instance, if a security service provider 210 supplying DES encryption fails, RSA encryption can be used instead.

In operation 510, any lost packets may be identified and retransmitted. Specifically, the security provider manager 208 may keep track of which packets have been successfully received by the remote application. Each application packet may then be acknowledged so that unacknowledged packets are retransmitted using the new security service provider 210. This recovery mechanism may occur completely transparent to the applications 202.

In order to prevent a failure from affecting the applications 202, an address space of the applications 202 may be different from that of the security service providers 210. Further, a host on which each of the applications 202 is executed may be different from a host on which each of the security service providers 210 is executed. This allows security component distribution and greater flexibility.

Figure 6:
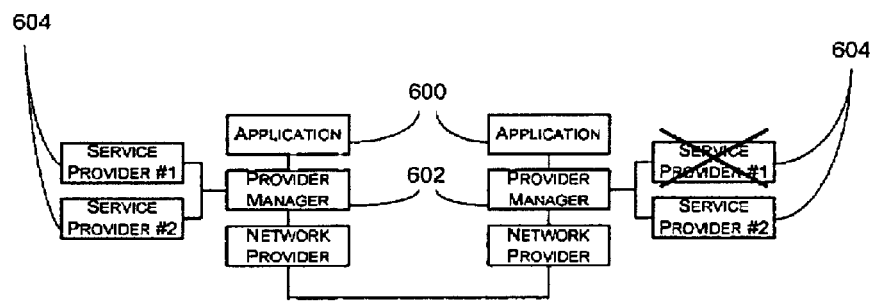
FIG. 6 is a schematic diagram illustrating an example of operation of a preferred embodiment.

FIG. 6 is a schematic diagram illustrating an example of operation of a preferred embodiment. In such example, two applications 600 use security provider managers 602 to communicate. Each security provider manager 602 can handle two or more different types of security service providers 604.

In use, the security provider managers 602 decide to use the security service providers 604 of type #1 to start the secure communication. If one or both instances of the security service providers 604 fail, the security provider managers 602 negotiate another security service providers 604 and retransmit packets that were lost during the security service provider 604 failure. In the instant example, the network connection remains the same after the security service provider 604 has failed. This is useful if it is not possible, costly, or very time-consuming to use another network connection.

Figure 7:
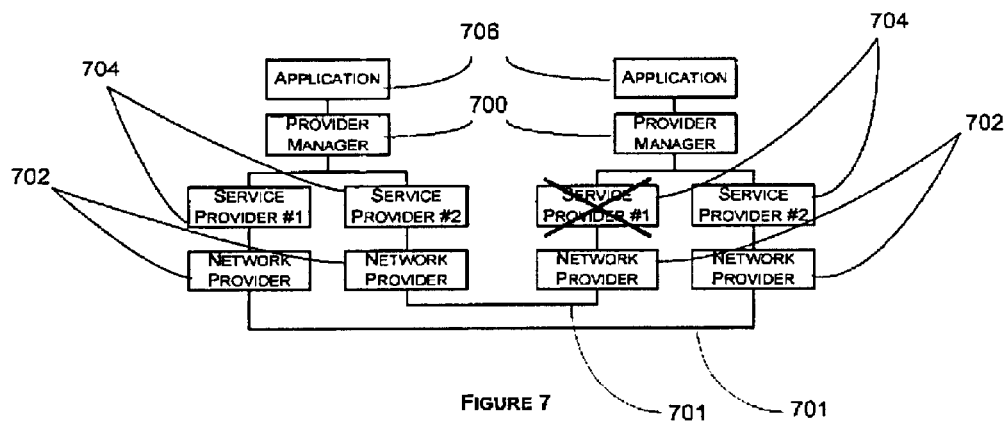
FIG. 7 is a schematic diagram illustrating an example of operation of the security provider managers of a preferred embodiment, where a separate network communication path and network providers are established for each of the security service providers.

FIG. 7 is a schematic diagram illustrating an example of operation of the security provider managers 700 where a separate network communication path 701 and network providers 702 are established for each of the security service providers 704. This can be useful if different networks are available, thus improving the resistance against network attack, by dynamically changing network providers 702 when failures are detected. It should be noted that from the perspective of the applications 706, there is only one communication path.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing the use of a plurality of security service providers during network communication, comprising the steps of:
   (a) utilizing a first security service provider for affording secure communication between applications using a network;
   (b) detecting an event relating to the secure communication between the applications; and
   (c) selecting a second security service provider for affording secure communication between the applications using the network in response to the detection of the event;
      wherein the second security service provider is executed on a host different from that of the first security service provider;
      wherein use of the first security service provider is discontinued in response to the detection of the event;
      wherein the second security service provider provides a first type of encryption that is different from that of the first security service provider.

2. The method as recited in claim 1, wherein the event is a security-related event.

3. The method as recited in claim 2, wherein the security-related event includes a run-time error.

4. The method as recited in claim 2, wherein the security-related event includes an intrusion by a hacker.

5. The method as recited in claim 1, and further comprising the step of generating a notification in response to the detection of the event.

6. The method as recited in claim 1, wherein an address space of the applications is different from that of the security service providers.

7. The method as recited in claim 1, wherein a host on which each of the applications is executed is different from a host on which each of the security service providers is executed.

8. The method as recited in claim 1, wherein the secure communication between the applications is facilitated by at least one network provider.

9. A computer program product for managing the use of a plurality of security service providers during network communication, comprising:
   (a) computer code for utilizing a first security service provider for affording secure communication between applications using a network;
   (b) computer code for detecting an event relating to the secure communication between the applications; and
   (c) computer code for selecting a second security service provider for affording secure communication between the applications using the network in response to the detection of the event;
      wherein the second security service provider is executed on a host different from that of the first security service provider
      wherein use of the first security service provider is discontinued in response to the detection of the event;
      wherein the second security service provider provides a first type of encryption that is different from that of the first security service provider.

10. The computer program product as recited in claim 9, wherein the event is a security-related event.

11. The computer program product as recited in claim 10, wherein the security-related event includes a run-time error.

12. The computer program product as recited in claim 10, wherein the security-related event includes an intrusion by a hacker.

13. The computer program product as recited in claim 9, and further comprising computer code for generating a notification in response to the detection of the event.

14. The computer program product as recited in claim 9, wherein an address space of the applications is different from that of the security service providers.

15. The computer program product as recited in claim 9, wherein a host on which each of the applications is executed is different from a host on which each of the security service providers is executed.

16. The computer program product as recited in claim 9, wherein the secure communication between the applications is facilitated by at least one network provider.

17. A security provider management system for managing the use of a plurality of security service providers during network communication, comprising:
   (a) logic for utilizing a first security service provider for affording secure communication between applications using a network;
   (b) logic for detecting an event relating to the secure communication between the applications; and (c) logic for selecting a second security service provider for affording secure communication between the applications using the network in response to the detection of the event;
  wherein the second security service provider is executed on a host different from that of the first security service provider;
  wherein use of the first security service provider is discontinued in response to the detection of the event;
  wherein the second security service provider provides a first type of encryption that is different from that of the first security service provider.

18. A method for establishing secure communication over a network using a plurality of security service providers, comprising the steps of:
  (a) receiving an indication that communication is to be established on a network between a first application and a second application;
  (b) choosing at least one of a plurality of security service providers for affording secure communication between the first application and the second application utilizing the network; and
  (c) utilizing the chosen security service provider for affording secure communication between the first application and the second application utilizing the network;
    wherein a first security service provider is executed on a host different from that of a second security service provider;
    wherein use of the first security service provider is discontinued in response to the detection of an event;
    wherein the second security service provider provides a first type of encryption that is different from that of the first security service provider.

19. The method as recited in claim 18, wherein the at least one security service provider is chosen by exchanging a set of acceptable security service providers between the first application and the second application utilizing the network, and choosing at least one of the security service providers from the set.

20. The method as recited in claim 19, wherein the at least one security service provider is chosen based on whether it is acceptable to both the first application and the second application.

21. The method as recited in claim 18, wherein the at least one security service provider is chosen based on security requirements associated with the secure communication between the first application and the second application.

22. The method as recited in claim 18, wherein each of the security service providers are utilized for affording secure communication between the first application and the second application using a separate network connection.

23. The method as recited in claim 18, wherein each of the security service providers are utilized for affording secure communication between the first application and the second application using a separate network provider.

24. A computer program product for establishing secure communication over a network using a plurality of security service providers, comprising:
  (a) computer code for receiving an indication that communication is to be established on a network between a first application and a second application;
  (b) computer code for choosing at least one of a plurality of security service providers for affording secure communication between the first application and the second application utilizing the network; and
  (c) computer code for utilizing the chosen security service provider for affording secure communication between the first application and the second application utilizing the network;
    wherein a first security service provider is executed on a host different from that of a second security service provider;
    wherein use of the first security service provider is discontinued in response to the detection of an event;
    wherein the second security service provider provides a first type of encryption that is different from that of the first security service provider.

25. The computer program product as recited in claim 24, wherein the at least one security service provider is chosen by exchanging a set of acceptable security service providers between the first application and the second application utilizing the network, and choosing at least one of the security service providers from the set.

26. The computer program product as recited in claim 25, wherein the at least one security service provider is chosen based on whether it is acceptable to both the first application and the second application.

27. The computer program product as recited in claim 24, wherein the at least one security service provider is chosen based on security requirements associated with the secure communication between the first application and the second application.

28. The computer program product as recited in claim 24, wherein each of the security service providers are utilized for affording secure communication between the first application and the second application using a separate network connection.

29. The computer program product as recited in claim 24, wherein each of the security service providers are utilized for affording secure communication between the first application and the second application using a separate network provider.

30. The method as recited in claim 1, wherein the second security service provider provides a first type of encryption including data encryption standard (DES) encryption that is different from an RSA encryption that is provided by the first security service provider.

* * * * *

UNITED STATES PATENT AND TRADEMARK OFFICE
CERTIFICATE OF CORRECTION

| | | |
|---|---|---|
| PATENT NO. | : 6,757,822 B1 | Page 1 of 1 |
| APPLICATION NO. | : 09/586558 | |
| DATED | : June 29, 2004 | |
| INVENTOR(S) | : Richard J. Feiertag et al. | |

It is certified that error appears in the above-identified patent and that said Letters Patent is hereby corrected as shown below:

Column 1, line 22 replace "Departrnent" with --Department--.

Signed and Sealed this

Twenty-seventh Day of November, 2007

JON W. DUDAS
*Director of the United States Patent and Trademark Office*